(12) United States Patent
Sar et al.

(10) Patent No.: US 12,494,022 B2
(45) Date of Patent: Dec. 9, 2025

(54) MANAGING A RISK-FREE WALKWAY USING AUGMENTED REALITY

(71) Applicant: INTERNATIONAL BUSINESS MACHINES CORPORATION, Armonk, NY (US)

(72) Inventors: Sudhanshu Sekher Sar, Bangalore (IN); Sudheesh S. Kairali, Kozhikode (IN); Sarbajit K. Rakshit, Kolkata (IN); Satyam Jakkula, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 18/066,825

(22) Filed: Dec. 15, 2022

(65) Prior Publication Data

US 2024/0203059 A1 Jun. 20, 2024

(51) Int. Cl.
*G06T 19/00* (2011.01)
*H04L 67/306* (2022.01)

(52) U.S. Cl.
CPC .......... *G06T 19/006* (2013.01); *H04L 67/306* (2013.01)

(58) Field of Classification Search
CPC ............. G06T 19/006; G01C 21/3461; G01C 21/3647; G06V 10/70; G06V 10/82; G06V 20/20; G06V 20/58; G08G 1/096855; G08G 1/16
See application file for complete search history.

(56) References Cited

U.S. PATENT DOCUMENTS

| | | | |
|---|---|---|---|
| 10,198,779 B2 | 2/2019 | Pittman | |
| 11,099,562 B1 | 8/2021 | Ebrahimi Afrouzi | |
| 11,631,150 B1* | 4/2023 | Madden | G06V 20/20 |
| | | | 705/314 |
| 2013/0214909 A1* | 8/2013 | Meijers | H04W 4/029 |
| | | | 340/10.5 |
| 2018/0182170 A1* | 6/2018 | Lim | G06T 19/006 |
| 2021/0201218 A1 | 7/2021 | Guiol | |
| 2022/0198763 A1* | 6/2022 | Tanimori | G08G 1/16 |
| 2023/0143198 A1* | 5/2023 | Vianello | G06Q 30/0278 |
| | | | 705/315 |
| 2024/0202644 A1 | 6/2024 | Sar et al. | |

FOREIGN PATENT DOCUMENTS

WO 2022017981 A1 1/2022

OTHER PUBLICATIONS

Disclosed Anonymously, "Autonomous Baggage Handling Method & System," IP.com Prior Art Database Technical Disclosure, IP.com No. IPCOM000259365D, Aug. 5, 2019, 6 pgs.
(Continued)

*Primary Examiner* — Ming Wu
(74) *Attorney, Agent, or Firm* — Andre L. Adkins (57) ABSTRACT

Techniques are described with respect to a system, method, and computer product for managing a risk-free walkway. An associated method includes defining a virtual space in augmented reality and determining a geofence between at least a contaminated area and the risk-free walkway that avoids the contaminated area. The method further includes rendering augmented reality content in the virtual space with the risk-free walkway being associated with a user.

20 Claims, 7 Drawing Sheets

(56) References Cited

OTHER PUBLICATIONS

Disclosed Anonymously, "Method and System of Social Distancing Management Using Blockchain-Powered Robotic Swarms," IP.com Prior Art Database Technical Disclosure, IP.com No. IPCOM000263971D, Oct. 28, 2020, 7 pgs.

Kunjir, Effectiveness of Practicing Social Distancing in Museums and Art Galleries for Visitors Using Mobile Augmented Reality (MAR): S.M.A.R.T.—Social Distancing Using Mobile Augmented Reality Technology, International Journal of Art, Culture and Design Technologies, vol. 9, Issue 1, Jan.-Jun. 2020, IGI Global, [accessed Oct. 24, 2022], pp. 1-14.

Siddiqui, et al., "Internet of Things (IoT) Enabled Architecture for Social Distancing During Pandemic," Frontiers in Communications and Networks, Apr. 2021, vol. 2, Article 614166, Published Apr. 15, 2021, pp. 1-21, Retrieved from the Internet: <https://www.frontiersin.org/articles/10.3389/frcmn.2021.614166/full>.

Youtube: Bubli Ahmed, "Amazon warehouse robots", 2018, 02 pages, https://www.youtube.com/watch?v=4sEVX4mPuto.

\* cited by examiner

MANAGING A RISK-FREE WALKWAY USING AUGMENTED REALITY

BACKGROUND

This disclosure relates generally to the field of augmented reality, and more particularly to managing a risk-free walkway using augmented reality.

Viruses, diseases, and infectious bacteria pose a significant health hazard to people in frequently habited areas (e.g., airports, hospitals, shopping centers, etc.). A possible means to reduce the amount of exposure to the aforementioned health hazard is to reduce the amount of individuals in a confined space by allocating zoning within the confined space allowing a flow of pedestrian traffic free of congregation and collisions in addition to reduction of exposure to widespread biological contaminants.

Augmented reality technology enables enhancement of user perception of a real-world environment through superimposition of a digital overlay in a display interface providing a view of such real-world environment. Augmented reality enables display of digital elements to highlight or otherwise annotate specific features of the physical world. In particular, augmented reality may be utilized to display visualization of not only contamination within a real world environment, but also virtual zoning within said real world environment in order to prevent exposure to dangerous contaminants.

SUMMARY

Additional aspects and/or advantages will be set forth in part in the description which follows and, in part, will be apparent from the description, or may be learned by practice of the invention.

A system, method, and computer product for managing a risk-free walkway is disclosed herein. In some embodiments, the computer-implemented method for managing a risk-free walkway includes defining a virtual space in augmented reality; determining a geofence between at least a contaminated area and the risk-free walkway that avoids the contaminated area; and rendering augmented reality content in the virtual space with the risk-free walkway being associated with a user.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

As used herein, the term "augmented reality (AR)" is an interactive experience of a real-world environment where the objects that reside in the real-world are "augmented" by computer-generated perceptual information, sometimes across multiple sensory modalities, including visual, auditory, haptic, somatosensory, and olfactory. The overlaid sensory information can be constructive (i.e. additive to the natural environment) or destructive (i.e. masking of the natural environment) and is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. In some example, augmented reality brings components of the digital world into a person's perception of the real world and does so not as a simple display of data, but through the integration of immersive sensations that are perceived as natural parts of an environment.

As described herein, a "geofence" is a virtual perimeter or zone for a real-world geographic area or augmented environment configured to be dynamically generated and viewed via a computing device such as, but not limited to a computer-mediated reality device. In particular, geofences and areas within geofence boundaries are designated contamination zones.

As described herein, a "contamination zone" is an area with a detected presence or high probability of risk including but not limited to presence of infectious particles (e.g., viruses, harmful bacteria, etc.), active shooter, acts of intent, bomb threat, building move, chemical exposure, external, civil unrest, communication/telephony failure, dam failure, drought, earthquake, epidemic, evacuation, explosion, external flood, fire, flood, forensic admission, gas/emissions leak, generator failure, hazmat incident, hazmat incident with mass casualties, hostage situation, hurricane, HVAC failure, inclement weather, infectious disease outbreak, internal fire, internal flood, IT system outage, landslide, large internal spill, mass casualty incident, natural gas disruption, natural gas failure, other utility failure, pandemic, patient surge, picketing, planned power outages, power outage, radiation exposure, seasonal influenza, sewer failure, shelter in place, strikes/labor action/work stoppage, suicide, supply chain shortage/failure, suspicious odor, suspicious package/substance, temperature extremes, tornado, transportation failure, trauma, tsunami, VIP situation, water contamination, water disruption, weapon, or any other applicable risk known to those of ordinary skill in the art.

The following described exemplary embodiments provide a method, computer system, and computer program product for managing a risk-free walkway. The spreading of infectious bacteria/diseases is exacerbated by public spaces due to the inherent frequent foot traffic. In particular, transportation hubs (e.g., airports, train stations, bus stations, etc.), shopping centers, etc. have become hotbeds for spreading of infectious bacteria/diseases and specific areas within the aforementioned venues inherently have a higher risk of disease dissemination due to frequent congregation of individuals. For example, baggage/package retrieval areas (e.g., baggage claim, baggage carousel, etc.) are highly susceptible to spreading of infectious diseases due to the frequent congregation of individuals from different flights, trains, buses, etc. Therefore, the present embodiments have the capacity to reduce the amount of exposure to infectious bacteria/diseases within public spaces by classifying virtual contamination zones and generating risk-free walkways for travelers that not only utilize augmented reality technologies to depict contamination of public spaces in real-time, but also facilitate risk-free arrival of individuals to destinations within public locations in a manner that circumvents collisions with and/or exposure to other travelers. Thus, the present embodiments improve the safety of travelers, and optimize inherently problematic situations in public venues such as the check-in process and package retrieval process during travel.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch payment devices or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
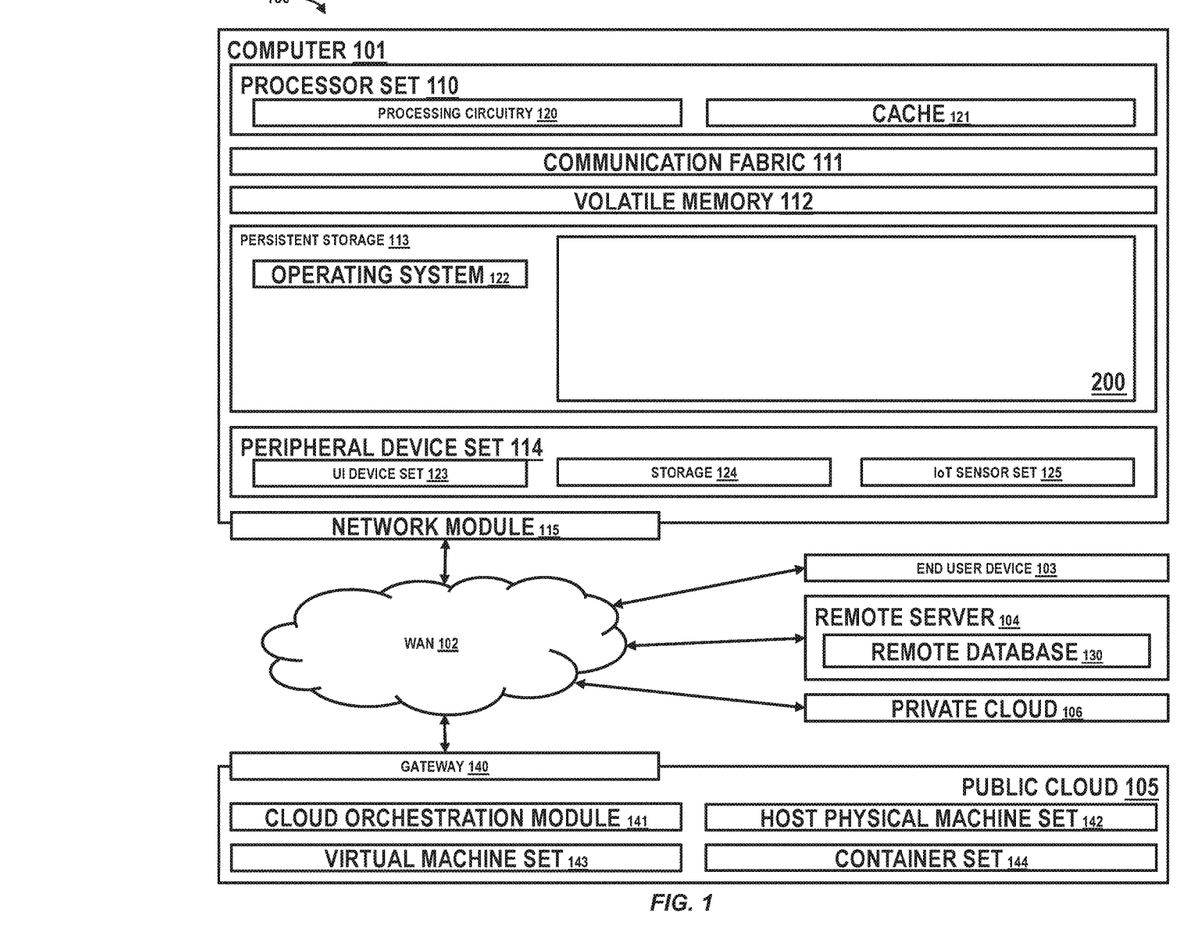
FIG. 1 illustrates a networked computer environment, according to an exemplary embodiment.

The following described exemplary embodiments provide a system, method and computer program for managing a risk-free walkway. Referring now to FIG. 1, a computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113, peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
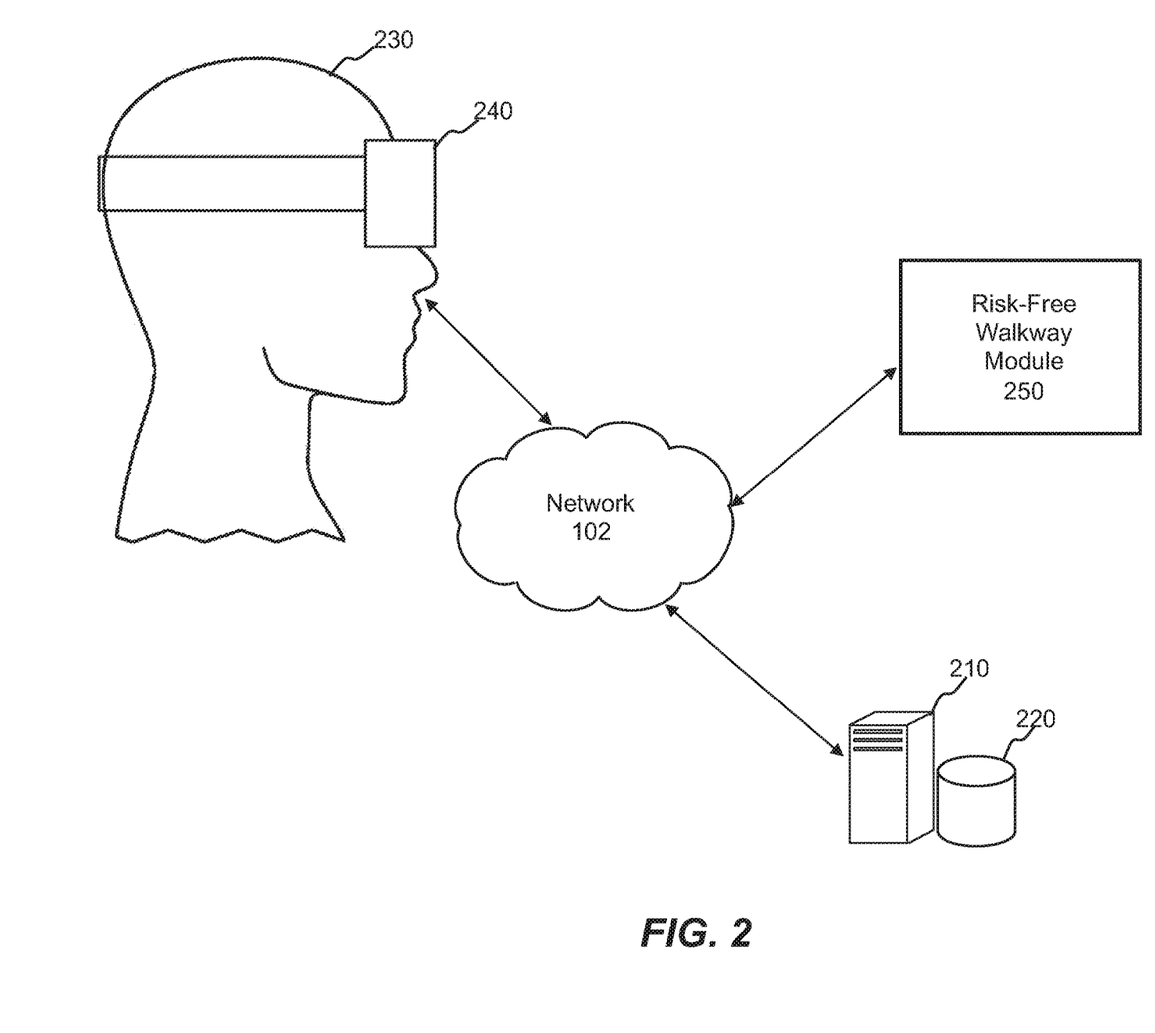
FIG. 2 illustrates a risk-free walkway management system environment, according to an exemplary embodiment.

Referring now to FIG. 2, a functional block diagram of a networked computer environment illustrating a package delivery system 200 (hereinafter "system") comprising a server 210 communicatively coupled to a database 220, a user 230 associated with a computing device 240, and a risk-free walkway module 250, each of which are communicatively coupled over WAN 102 (hereinafter "network") and data from the components of system 200 transmitted across the network is stored in database 220. In some embodiments, server 210 is configured to operate a centralized platform configured for user 230 to access via computing device 240 and/or other applicable computing device. Computing device 240 may take the form of a desktop computer, laptop computer, tablet computer, smart phone, smart watch or other wearable computer, computer-mediated reality device, mainframe computer, quantum computer or any other form of computer or mobile device now known or to be developed in the future that is capable of running a program, accessing a network or querying a database. It should be appreciated that FIG. 2 provides only an illustration of one implementation and does not imply any limitations with regard to the environments in which different embodiments may be implemented. Many modifications to the depicted environments may be made based on design and implementation requirements.

In another embodiment, risk-free walkway module 250 may operate on more than one computer, server computer, or some combination of computers and server computers, for example, a plurality of computers communicating across the network with a single server computer. In another embodiment, for example, risk-free walkway module 250 may operate on a plurality of server computers communicating across the network with a plurality of client computers. Alternatively, risk-free walkway module 250 may operate on a network server communicating across the network with server 210 and a plurality of client computers. FIG. 2 depicts one embodiment of package delivery system 200 in which methods of managing a risk-free walkway are described herein and may be applied to public spaces/venues. For example, in an airport or other applicable transportation hub, risk free walkways are designed to allow user 230 to circumvent contamination zones and other travelers/individuals in their pursuit towards collection of their package. User 230 views the surrounding environment through computing device 240 and/or any other applicable computing device configured to portray the environment of the venue that user 230 is in (e.g., interactive map of venue, computing device enabled augmented reality depiction, etc.), in which the environment is depicted with overlays indicated contaminated zones, risk-free walkways, visual data and analytics/metrics associated with the aforementioned, and any other applicable augmented reality media content known to those of ordinary skill in the art. For example, risk-free walkway module 250 may generate and present to user 230 augmented reality media content depicting one or more contaminated zones within the airport, a risk-free walkway directed to a destination in the airport configured to circumvent the one or more contaminated zones, and visually overlaid data associated with one or more elements of the airport environment (e.g., distance from other travelers, probability of contamination associated with contamination zones, etc.).

In some embodiments, risk-free walkway module 250 is further configured to perform distance computation from contaminated zones as well as health parameters in order to detect a level of disease spread, determine amelioration strategies to be deployed in order to lower a risk of disease spread and interaction with possible disease sources, and detect contours of spatiotemporal respiratory droplet clumps allowing advising of persons of appropriate actions to take in order to prevent exposure to contaminated zones and other applicable sources of contamination. It should be noted that in addition to user 230 being provided risk-free walkways, risk-free walkway module 250 may also generate warnings configured with different colors, blinking, brightening, or any other configured interface change to facilitate usability concerns for color blindness, current background colors (e.g. don't show green over grass) or personal preference. For example, while user 230 is viewing the environment through computing device 240, the environment is not only modified through the augmented reality glasses with depictions of the risk-free walkways and the contaminated areas, but also with warnings, suggestions, and other applicable advisory information associated with the airport for user 230.

Database 220 may not only serve as a corpus for travelers information associated with user 230 (e.g., itineraries, reservation codes, travel delays, venue maps, etc.), but also a repository for outbreak, disease dissemination, and other public hazard-related data necessary in order for risk-free walkway module 250 to generate the risk-free walkways in a manner that allows user 230 to arrive at the applicable destination to receive package without coming into contact with areas designated as high-risk areas. The corpus may further store data of various types including but not limited to historical data and analytics relating to user 230 or the venue, level of contamination, risks user 230 wishes to avoid (e.g., specific particles, allergies, etc.), feedback associated with user 230, etc. In some embodiments, a user profile associated with user 230 may generated based on data stored database 220, in which the user profile may account for preferences of user 230 (e.g., AR depictions/dimensions, preferred package retrieval destinations, etc.), social media activity, biological data (e.g., body temperature, gaze detection, etc.). The user profile may be utilized by risk-free walkway module 250 to assist in generating optimized risk-free walkways tailored specifically for user 230 including overlay information integrated into the AR content depicted to user 230 via computing device 240.

Figure 3:
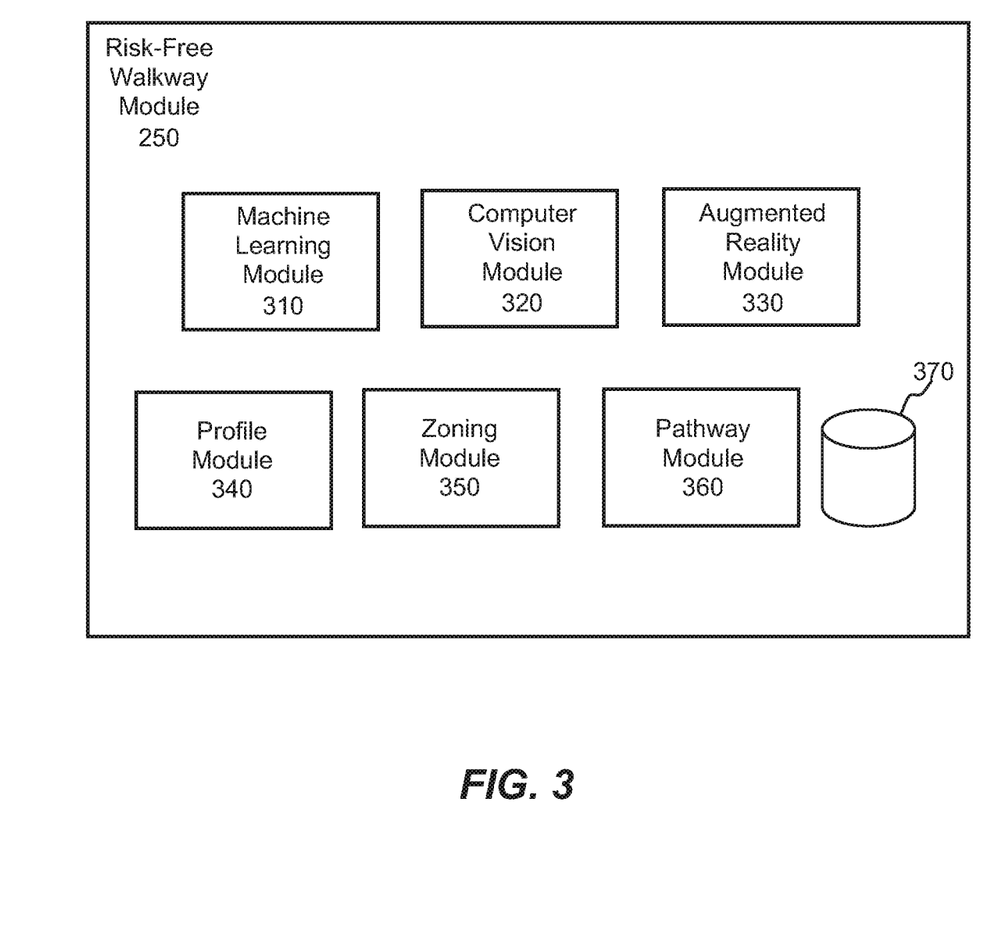
FIG. 3 illustrates a block diagram of various modules associated with the risk-free walkway management system of FIG. 2, according to an exemplary embodiment.

Referring now to FIG. 3, an example architecture 300 of risk-free walkway module 250 is depicted, according to an exemplary embodiment. In some embodiments, risk-free walkway module 250 comprises a machine learning module 310, a computer vision module 320, an augmented reality ("AR") module 330, a profile module 340, a zoning module 350, a walkway module 360, a risk-free walkway module database 370. It should be noted that machine learning module 310, computer vision module 320, augmented reality module 330, profile module 340, zoning module 350, and walkway module 360 are communicatively coupled over the network, and may function in unison in order to generate risk-free walkways for user 230 configured to be stored in risk-free walkway module database 370.

Machine learning module 310 is configured to use one or more heuristics and/or machine learning models for performing one or more of the various aspects as described herein. In some embodiments, the machine learning models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. In particular, machine learning module 310 is configured to utilize data collected by one or more of server 210, computing device 240, one or more sensor systems associated with system 200, etc. as training data sets in order for machine learning module 310 to generate one or more predictions for risk-free walkways associated with user 230. For example, predictions pertaining to contaminated zones associated with the airport that the risk-free walkway will avoid, destinations/locations of venues where package is retrieved, areas within venues that are frequently densely populated (e.g., lounges, restrooms, etc.)

Figure 4:
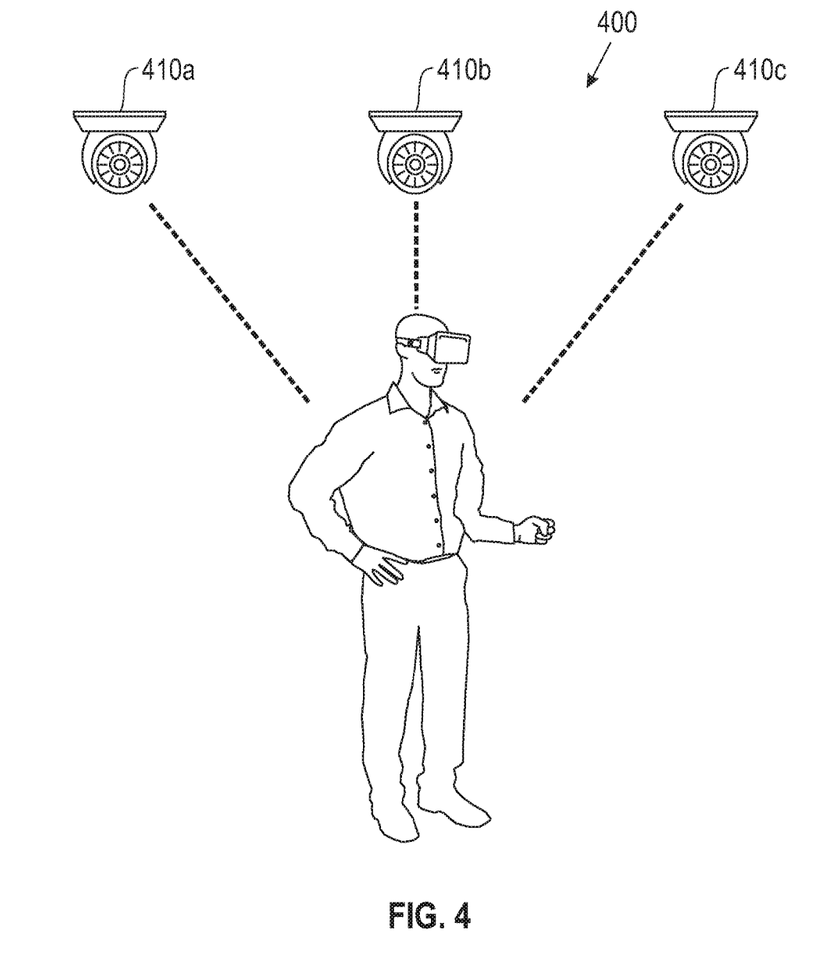
FIG. 4 illustrates a sensor system associated with the risk-free walkway management system of FIG. 2, according to an exemplary embodiment.

Computer vision module 320 is configured to utilize algorithms or techniques that identify and process objects in images and videos. In particular, computer vision module 320 receives computer vision data including images and videos from one or more of server 210, sensor systems associated with system 200, or any other applicable sources for images and videos associated with a venue and/or user 230 (e.g., monitoring system, security system, etc.). Computer vision trains computers to interpret and understand the received data such as digital image and/or video content, and can include techniques such as machine learning and/or use of machine learning models such as deep learning models (provided by machine learning module 310) to accurately identify and/or classify objects, and possibly react to what it identifies. In some embodiment, one or more computer vision algorithms can break or decompose the original region (images of) into smaller parts, classifying the smaller parts with simpler concepts. One or more computer vision algorithms can also retrieve or receive similar images. In an embodiment, one or more knowledge augmented machine learning algorithms generated by machine learning module 310 can automatically annotate regions. Acquired knowledge about concepts can be used to search for candidate regions to be annotated. In particular, the aforementioned assists with the classification of contaminated zones within the venue based on data collected by one or more of server 210, sensor systems associated with system 200, and risk-free walkway module 250. Contaminants on an entity or within a venue is detected using any combination of sensor data, one or more images, and one or more contamination propagation patterns. Machine learning module 310 and computer vision module 320 receive inputs of sensor data, the one or more images, and the one or more contamination propagation patterns, while the outputs are the determination of contamination zones, along with the locations of different types and levels of contamination. In some embodiments, virtual zones may be deactivated by risk-free walkway module 250 based on a zone being classified as contaminated in light of collected sensor data derived from sensor system 400.

AR module 330 is configured to render and map augmented reality content in a defined virtual space for presentation to user 230 via computing device 240. Augmented reality content may include, but is not limited to image, video, audio, text, or any other applicable type of multimedia data known to those of ordinary skill in the art. In some embodiments, AR module 330 communicates with one or more sensors of sensor systems associated with system 200 and/or computing device 240 in order to track the real position and orientation of user 230, define the virtual space surrounding user 230, and visually designate contaminated zones, paths, obstacles, etc. associated with user 230 based on predictions ascertained from machine learning module 310 and computer vision module 320. For example, the AR content generated by AR module 330 for depiction through computing device 240 may be a visual pathway to a destination including coloring, shading, overlaid information, etc. distinguishing the visual pathway from its surroundings within the virtual space.

Profile module 340 is configured to generate and maintain the user profile of user 230, in which the user profile may be utilized by AR module 330 to generate AR content specifically tailored to user 230. Information such as geo-location, traveler data (e.g., trip itineraries, record locators, confirmation codes, etc.), traveler credentials (e.g., frequent flyer program benefits, expedited check-in, lounge access, etc.), social media activity, browsing activity, AR depiction preferences (e.g., brightness, notification frequency, overlaid presentation preference, etc.), etc. may be ascertained from the user profile. For example, AR content indicating user 230 has access to an airport lounge along the risk-free walkway may be generated based on data ascertained from the user profile. In some embodiments, data from the user profile is utilized in order for risk-free walkway module 250 to assign a priority to the generated risk-free walkway. Assignment of a priority allows risk-free walkways to be scheduled in priority-based order preventing overlapping, clustering, and/or intersecting of risk-free walkways generated for multiple users.

Zoning module 350 is configured to designate areas within the applicable venue as contaminated zones based upon analyses of data acquired from one or more of one or more of server 210, computing device 240, one or more sensor systems associated with system 200. For example, ultraviolet visible spectroscopy derived data collected by one or more sensor systems associated with system 200 indicates presence of contamination within an area associated with the venue in which zoning module 350 classifies the area as a contaminated zone that must be circumvented via the risk-free walkway. Particulars regarding zoning are described in greater details in reference to FIG. 6.

Pathway module 360 is designed to generate the risk-free walkways based on data collected from any of the aforementioned modules of risk-free walkway module 250. Essentially, pathway module 360 is configured to function as an overlay program designed to account for map data associated with the venue including detailed map information corresponding to areas that user 230 traverses. Pathway module 360 generates a virtual pathway that is overlaid on the map data in which the virtual pathway is provided to user 230 via the view of computing device 240 when some or all of the path is within the real-world direction and incline view of the display associated with computing device 240. The position of the path is determined relative to the position of user 230 ascertained from computing device 240 and details derived from the map data. The map data may further include topography and features of the area to be traversed which, in some embodiments, may include, terminals, baggage claim, trails, paths, forest areas, moving water, water crossings, tree lines, rocky areas, open fields, roads, parks, campsites, sources of drinking water, and nearest point of help or assistance. Information relating to the generation of risk-free walkways is discussed in greater detail in reference to FIG. 5.

Referring now to FIG. 4, an example sensor system 400 associated with system 200 is depicted, according to an exemplary embodiment. In some embodiments, sensor system 400 includes a plurality of sensors 410a, 410b, and 410c in which sensor 410a is an internet of things (IOT) sensor, sensor 410b is a charge-coupled device (CCD) sensor, and sensor 410c is an active-pixel CMOS sensor; however, any possible combination of sensors are within the scope of the disclosure in which sensors include, but are not limited to cameras, microphones, internet-of-things (IOT) sensors, weight scales, gas detectors, humidity sensors, accelerometers, gyroscopes, barometers, GPS sensors, thermometers, ultra-violet (UV) sensors, haptic sensors, biological-based sensors, or any other applicable sensors known to those of ordinary skill in the art. In some embodiments, sensor system 400 receives a plurality of sensor data derived from user 230 (via computing device 240 or any other applicable computing device) and 410a, 410b, and 410c in order to analyze user 230 and the venue user 230 is within. One purpose of sensor system 400 is to not only track user 230 in order to provide server 210 and/or computing device 240 with relevant information (e.g., venue specific data) needed to generate the risk-free walkways, but also to establish the location and the trajectory of user 230 in reference to computing device 240. As the user 230 moves about space in the venue, computing device 240 may continuously or repeatedly track and thereby update the user's position within the venue. This dynamic position of the user 230 may then lead to continuous or repeated rendering of new sets of images for the user's eyes, based on data ascertained from sensor system 400, which may be sent to risk-free walkway module 250 for generation of AR content by AR module 330 designed to be depicted through computing device 240. In some embodiments, sensor system 400 may provide streaming data of the dynamic position of user 230, and AR module 330 may use this streaming data to update the display of computing device 240 as needed, thereby enabling an augmented-reality experience.

For example, sensor system 400 allows user 230 to track their location within the venue and view it via the centralized platform in which computing device 240 depicts the location of user 230 from various angles including at least one angle from 410a, 410b, 410c, and the applicable sensor of computing device 240. In some embodiments, the angle ascertained from the applicable sensor of computing device 240 allows user 230 to view a displayed line overlaying a real-world view of the venue, aligning with a selected path to traverse to a destination designed for retrieving package. In some embodiments, sections of the risk-free walkway are a next-portion of the entire route and indicate a direction to a point at which a turn occurs and subsequent portion of the entire route begins; thus the risk-free walkway may be updated in real-time based on the gaze direction of user 230 and the data collected from sensor system 400. Virtual path section may be displayed in a particular color indicating information associated with the portion of the route. For example, highlighting of contaminated zones that the risk-free walkways seek to circumvent and designation of rest areas, lounges, restrooms, connectivity hotspots, etc. along the route of user 230 within the risk-free walkway. Sensor system 400 may further assist pathway module 360 with avoiding obstacles and obstructions in generated risk-free walkways by detecting said obstacles and obstructions within routes of a risk-free walkway, portraying representations of the obstacles and obstructions within the AR content generated by AR module 330. Detected obstacles and obstructions may include, but are not limited to long route duration, blockades, elevation changes, route difficulty, assistance needed, and any other applicable considerations.

Figure 5:
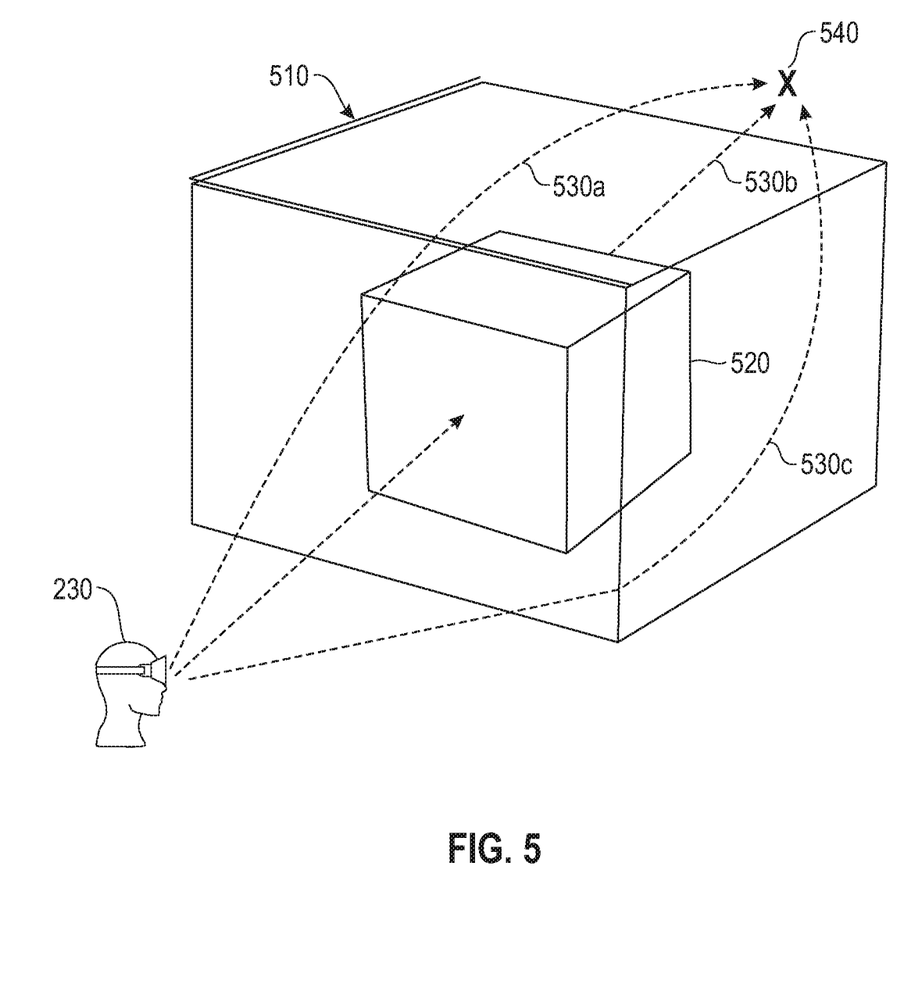
FIG. 5 schematically illustrates a method for determining risk-free walkways with collision avoidance, according to an exemplary embodiment.

Referring now to FIG. 5, a risk-free walkway visualization 500 generated by risk-free walkway module 250 is depicted, according to an exemplary embodiment. In some embodiments, risk-free walkway visualization 500 is an augmented reality visualization generated by AR module 330 of routes determined by pathway module 360, in which one or more contaminated zones 520 in a physical environment 510 are established by zoning module 350 and one or more risk-free walkways 530a, 530b, and 530c around the detected contaminated zone(s) 520 in physical environment 510 are determined by pathway module 360. Risk-free walkways are designed to include multiple routes designed to guide user 230 to a destination 540 within physical environment 510, in which the routes may be determined based upon various factors including but not limited to gaze direction of user 230, level of congestion within the venue, updates to the map data (e.g., terminal closed, detours, etc.), or any other applicable factor taken into consideration when providing optimal routes. Destination 540 marks the route destination, in which AR module 330 is designed to overlay route information on elements of the AR environment corresponding to destination 540 which may include distance from current location to destination 540 along route length information, etc. In some embodiments, risk-free walkway module 250 prioritizes risk-free walkways 530a, 530b, and 530c based on computed risk-scores, in which risks are analyzed based on the length of the route, the amount of contaminated zones, data derived from the user profile, the amount of obstacles and obstructions surrounding user 230, etc. Upon analyses, the risk-scores are allocated to risk-free walkways 530a, 530b, and 530c, in which user 230 has the option to choose the risk-free walkway that they believe to be the safest path to destination 540. In a preferred embodiment, destination 540 is an area where user 230 may retrieve package; however, destination 540 may be any applicable target location that user 230 desires to arrive. As depicted, risk-free walkways 530a, 530b, and 530c are dashed or dotted lines; however, risk-free walkways may be depicted in various colors and visual representations with different dash and dot combinations corresponding to various walkway conditions and/or attributes. Contaminated zone(s) 520 in physical environment 510 may be detected in real-time by zoning module 350 based on sensor data collected from the combination of computing device 240 and sensor system 400 allowing routes to be calculated by pathway module 360 accounting for applicable obstacles, obstructions, and contamination zones.

Figure 6:
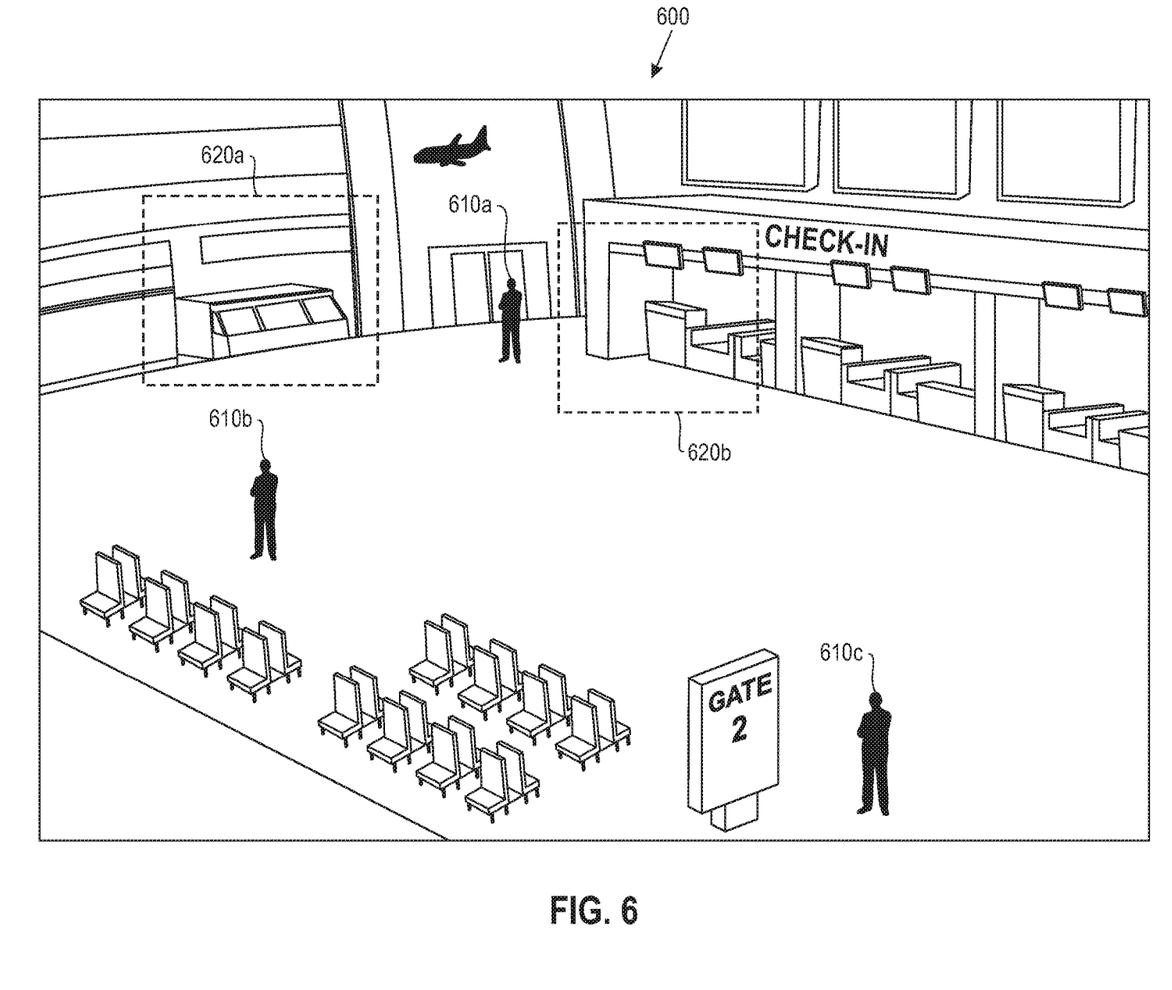
FIG. 6 illustrates a virtual zoned environment associated with the risk-free walkway management system of FIG. 2, according to an exemplary embodiment.

Referring now to FIG. 6, a virtually zoned environment 600 within an airport is depicted, according to an exemplary embodiment. Virtual zoned environment 600 illustrates a physical environment including a plurality of groups 610a, 610b, and 610c in which each of the groups are assigned to one of virtual zone 620a and virtual zone 620b generated by zoning module 350, which may be a destination for package retrieval, a waiting area, a haven, etc. As previously mentioned, the assignment of groups 610a, 610b, and 610c may be based on the user profile of each individual within groups 610a, 610b, and 610c, and in various embodiments the assignments may further be based on overlapping of routes of risk-free walkways that would likely result in collisions among travelers and/or interactions with contaminated zones. For example, it may be ascertained from the user profiles that the package of two distinct users are arriving at baggage claim at the same or significantly close times which would result in an influx of individuals at the baggage claim area; however, assignment of priority to risk-free walkways allows overlapping of risk-free walkways to be circumvented by assigning risk-free walkways that ensure that routes of users do not cross. In some embodiments, sensor system 400 collects environment data associated with the venue (e.g., origin point and destination point of risk-free walkway) including, but not limited to, room temperature, occupancy data, particle data (e.g., bacteria, viruses, other applicable particles, etc.), etc. in which the origin point and destination point are based upon traveler data ascertained from the user profile. For example, environment data indicating contamination of the destination point of the venue where user 230 is to retrieve packages (e.g., luggage, etc.) associated with traveler data of user 230, allows risk-free walkway module 250 to notify user 230 that their packages are not currently available for retrieval enabling pathway module 360 to determine an alternative path and/or detour that provides an opportunity to arrive at the destination point once the destination point is free of contamination.

While virtually zoned environment 600 is designed to represent an augmented version of a physical space, it should be noted that virtual zone 620a and virtual zone 620b are made visible to user 230 via AR module 330 depicted through computing device 240. In the instance in which computing device 240 is not a computer-mediated reality device, virtual zone 620a and virtual zone 620b are geofenced areas delineated on one or more maps of the venue presented via the centralized platform. Thus, user 230 is provided the functionality of ascertained their position within the venue in real-time in reference to the contaminated regions and virtual zone that has been assigned to them. In some embodiments, assignment of the virtual zones allows for zoning module 350 to determine one or more geofences that are designed to separate contaminated zones from virtual zones in a manner in which while user 230 is traversing along the risk-free walkway, risk-free walkway module 250 is alerting user 230 of their proximity to the boundaries of the geofence in order to prevent potential exposure to risks along routes.

Figure 7:
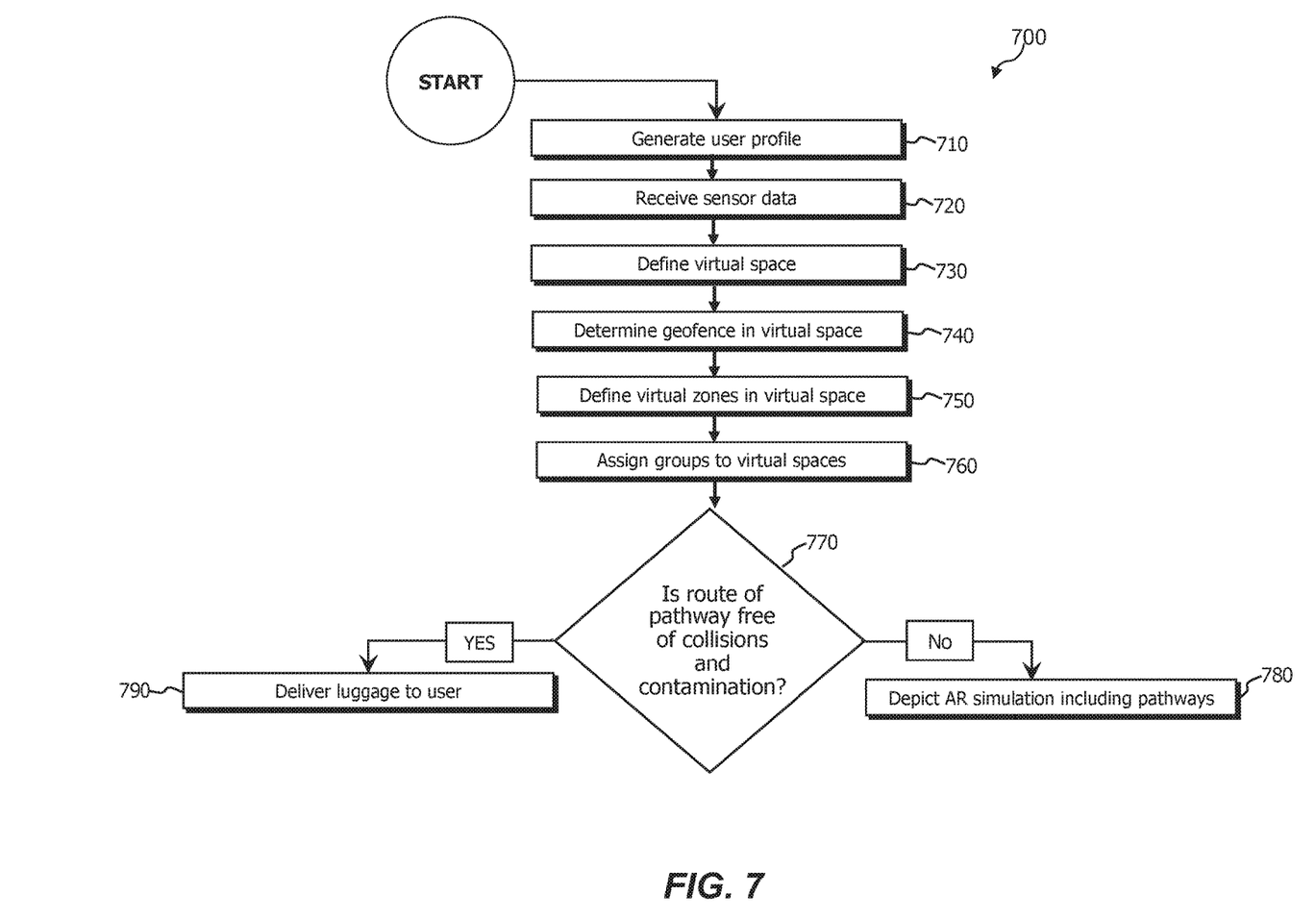
FIG. 7 illustrates a flowchart depicting a method for managing a risk-free walkway, according to an exemplary embodiment.

With the foregoing overview of the example architecture, it may be helpful now to consider a high-level discussion of an example process. FIG. 7 depicts a flowchart illustrating a computer-implemented process 700 for managing a risk-free walkway, consistent with an illustrative embodiment. Process 700 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 710 of process 700, profile module 340 generates a user profile associated with user 230. In some embodiments, the centralized platform operated by server 210 requests travel information from user 230 such travel itinerary (e.g., record locator, travel details, etc.) in order to generate the user profile. The user profile may be utilized by risk-free walkway module 250 in order to generate the risk-free walkways in accordance with the preferences and travel information associated with user 230. In some embodiments, the user profile may be generated based on data derived from risk-free walkway module database 370 serving as a corpus in which map data, user preferences, and other various types of data are accounted for in the user profile.

At step 720 of process 700, sensor system 400 receives sensor data associated with user 230 and the venue user 230 is within. The purpose of the sensor data is to ascertain relevant data associated with user 230 and the venue such as, but not limited to the geo-location of user 230, the layout of the venue, obstacles and obstructions within the venue, level of contamination of an area of the venue, etc. Collected sensor data is transmitted to risk-free walkway module 250 for processing by the applicable modules (e.g., machine learning module 310, computer vision module 320, etc.).

At step 730 of process 700, augmented reality module 330 defines the virtual space to be depicted to user 230 via computing device 240. The virtual space is configured to be a visualization of the view of user 230 in which augmented reality module 330 generates an AR display as an overlay on the current real-world view display on computing device 240.

At step 740 of process 700, pathway module 360 defines a geofence within the virtual space. The definition of one or more geofences within the virtual space in which the geofences serve as a definition of metes and bounds differentiating between areas of detected high contamination and areas within the venue that are safe and/or sanitized. One of the purposes of defining the geofence is to assist pathway module 360 with calculating routes of risk-free walkways that circumvent contaminated zones and collisions with other users.

At step 750 of process 700, zoning module 350 defines virtual zones within the virtual space. Zoning module 350 allocates the virtual zones to various users of the centralized platform in order to not only prioritize risk-free walkways based on factors ascertained from the respective user profiles, but also to ensure availability of non-contaminated zones for groups in order to prevent exposure to contaminated zones while traversing risk-free walkways and prevent overlapping and collision of risk-free walkways. Determining whether a zone is contaminated or not may be determined by zoning module 350 based on the environment data associated with the venue collected by sensor system 400, in which the level of contamination of zones may be updated in real-time not only allowing zoning module 350 to classify and allocate the virtual zones accordingly, but also supports the depiction of the virtual zones within augmented virtual reality content presented to user 230. In some embodiments, activation of a virtual zone by zoning module 350 is subject to analysis of population density of the origin point and destination point along with analyses performed on collected sensor data to ascertain real-time coverage on the applicable virtual zone.

At step 760 of process 700, zoning module 350 assigns the groups to virtual spaces. In some embodiments, zoning module 350 assigns the groups to the virtual spaces based on the traveler information ascertained from the user profile and the environment data collected by sensor system 400. For example, the traveler itinerary of user 230 indicates their package will be released at a specific baggage claim and the traveler itinerary of another traveler itinerary indicates their package will be released at the same baggage claim, in which virtual spaces are allocated according to priority ascertained from the user profile allowing both parties to retrieve packages without being in a densely populated destination point. Assignment of groups to virtual spaces may be based on user profiles (e.g., travel times, destination point allocation, etc.), collected environment data of the venue, population density within the venue, and/or factors specific to the venue such as traffic limitations, detours, etc.

At step 770 of process 700, risk-free walkway module 250 determines whether the route of the generated risk-free walkway is free of collisions and contamination. If not, step 780 of process 700 occurs in which risk-free walkway module 250 presents various routes of a risk-free contamination to user 230 on computing device 240 in which each route may be visualized based upon the detected gaze direction of user 230. Otherwise, step 790 of process 700 occurs in which risk-free walkway module 250 initiates delivery/transporting of the package of user 230 upon user 230 arriving at the destination. In some embodiments, delivery of package at the destination is accomplished by a robotics system configured to retain the package in a locked position until the user 230 provides a confirmation code or data derived from user 230 (e.g., reservation code, biometrics, access credentials, etc.) at the destination in order for the robotics system to release the package at the destination point. In other embodiments, arrival of the package at the destination is accomplished via the baggage claim in which user 230 receives the package based upon priority position and the other traveler allocated to the same baggage claims awaits at the assigned virtual zone.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for managing a risk-free walkway using augmented reality, the method comprising:
   defining, by a computing device, a virtual space in augmented reality;
   determining, by the computing device, a geofence between at least a contaminated area and the risk-free walkway that avoids the contaminated area; and
   rendering, by the computing device, augmented reality content in the virtual space with the risk-free walkway being associated with a user based on a user profile associated with the user comprising at least traveler information;
   wherein the risk-free walkway is rendered based on one or more predictions derived from a machine learning model utilizing training data sets comprising the user profile and assigned a priority based on the user profile and a risk score associated with the risk-free walkway.

2. The computer-implemented method of claim 1, wherein defining the virtual space comprises:
   generating, by the computing device, the user profile associated with the user; and
   assigning, by the computing device, a priority for the risk-free walkway to the user based on the user profile;
   wherein the traveler information comprises a traveler itinerary and the priority for allocating the virtual space is based on the traveler information.

3. The computer-implemented method of claim 2, wherein generating the user profile comprises:
   collecting, by the computing device, a plurality of environment data associated with an origin and a destination pertaining to the traveler information.

4. The computer-implemented method of claim 2, wherein the priority is designed to avoid collisions and contact between the user and a plurality of elements associated with a real world environment the virtual space is defined within.

5. The computer-implemented method of claim 1, wherein defining the virtual space comprises:
   receiving, by the computing device, a plurality of sensor data;
   analyzing, by the computing device, the plurality of sensor data and one or more contamination propagation patterns; and
   defining, by the computing device, a plurality of virtual zones within the virtual space based on the analysis;
   wherein each virtual zone of the plurality of virtual zones is associated with a risk-free walkway group and designed to be deactivated based on detected contamination.

6. The computer-implemented method of claim 5, wherein rendering augmented reality content comprises:
   adapting, by the computing device, a route of the risk-free walkway based on activation of at least one of the virtual zones;
   wherein the route is specific to the risk-free walkway group and leads the risk-free walkway group to a package receiving zone.

7. The computer-implemented method of claim 5, wherein defining the plurality of virtual zones further comprises:
   analyzing, by the computing device, a population density of at least one virtual zone of the plurality of virtual zones; and
   activating, by the computing device, the at least one virtual zone based on the analysis.

8. A computer program product for managing a risk-free walkway using augmented reality, the computer program product comprising a computer readable storage medium having program instructions embodied therewith, wherein the computer readable storage medium is not a transitory signal per se, the program instructions being executable by a processor to cause the processor to perform a method comprising:
   defining a virtual space in augmented reality;
   determining a geofence between at least a contaminated area and the risk-free walkway that avoids the contaminated area; and
   rendering augmented reality content in the virtual space with the risk-free walkway being associated with a user based on a user profile associated with the user comprising at least traveler information;
   wherein the risk-free walkway is rendered based on one or more predictions derived from a machine learning model utilizing training data sets comprising the user profile and assigned a priority based on the user profile and a risk score associated with the risk-free walkway.

9. The computer program product of claim 8, wherein defining the virtual space comprises:
   generating, by the computing device, the user profile associated with the user; and
   assigning, by the computing device, a priority for the risk-free walkway to the user based on the user profile;
   wherein the traveler information comprises a traveler itinerary and the priority for allocating the virtual space is based on the traveler information.

10. The computer program product of claim 9, wherein generating the user profile comprises:
    collecting, by the computing device, a plurality of environment data associated with an origin and a destination pertaining to the traveler information.

11. The computer program product of claim 9, wherein the priority is designed to avoid collisions and contact between the user and a plurality of elements associated with a real world environment the virtual space is defined within.

12. The computer program product of claim 8, wherein defining the virtual space comprises:
- receiving a plurality of sensor data;
- analyzing the plurality of sensor data and one or more contamination propagation patterns; and
- defining a plurality of virtual zones within the virtual space based on the analysis;
- wherein each virtual zone of the plurality of virtual zones is associated with a risk-free walkway group and designed to be deactivated based on detected contamination.

13. The computer program product of claim 12, wherein rendering augmented reality content comprises:
- adapting a route of the risk-free walkway based on activation of at least one of the virtual zones;
- wherein the route is specific to the risk-free walkway group and leads the risk-free walkway group to a luggage receiving zone.

14. The computer program product of claim 12, wherein defining the plurality of virtual zones further comprises:
- analyzing a population density of at least one virtual zone of the plurality of virtual zones; and
- activating the at least one virtual zone based on the analysis.

15. A computer system for managing a risk-free walkway using augmented reality, the computer system comprising:
- one or more processors;
- one or more computer-readable memories;
- program instructions stored on at least one of the one or more computer-readable memories for execution by at least one of the one or more processors, the program instructions comprising:
- program instructions to define a virtual space in augmented reality;
- program instructions to determine a geofence between at least a contaminated area and the risk-free walkway that avoids the contaminated area; and
- program instructions to render augmented reality content in the virtual space with the risk-free walkway being associated with a user based on a user profile associated with the user comprising at least traveler information;
- wherein the risk-free walkway is rendered based on one or more predictions derived from a machine learning model utilizing training data sets comprising the user profile and assigned a priority based on the user profile and a risk score associated with the risk-free walkway.

16. The computer system of claim 15, wherein program instructions to define the virtual space comprise:
- program instructions to generate the user profile associated with the user; and
- program instructions to assign a priority for the risk-free walkway to the user based on the user profile;
- wherein the traveler information comprises a traveler itinerary and the priority for allocating the virtual space is based on the traveler information.

17. The computer system of claim 16, wherein program instructions to generate the user profile comprise:
- program instruction to collect a plurality of environment data associated with an origin and a destination pertaining to the traveler information.

18. The computer system of claim 16, wherein the priority is designed to avoid collisions and contact between the user and a plurality of elements associated with a real world environment the virtual space is defined within.

19. The computer system of claim 15, wherein program instructions to define the virtual space comprise:
- program instructions to receiving, by the computing device, a plurality of sensor data;
- program instructions to analyze the plurality of sensor data and one or more contamination propagation patterns; and
- program instructions to define a plurality of virtual zones within the virtual space based on the analysis;
- wherein each virtual zone of the plurality of virtual zones is associated with a risk-free walkway group and designed to be deactivated based on detected contamination.

20. The computer system of claim 19, wherein program instructions to augmented reality content comprise:
- program instructions to adapt a route of the risk-free walkway based on activation of at least one of the virtual zones;
- wherein the route is specific to the risk-free walkway group and leads the risk-free walkway group to a package receiving zone.

\* \* \* \* \*